US006857439B1

(12) United States Patent
Perruca et al.

(10) Patent No.: US 6,857,439 B1
(45) Date of Patent: Feb. 22, 2005

(54) WASHING AGENTS DISPENSER FOR A DOMESTIC WASHING MACHINE, NAMELY A DISHWASHER

(75) Inventors: Giovanni Perruca, Motta de' Conti (IT); Fabio Nebbia, Giarole (IT)

(73) Assignee: Eltek S.P.A., Casale Monferrato (IT)

( * ) Notice: Subject to any disclaimer, the term of this patent is extended or adjusted under 35 U.S.C. 154(b) by 439 days.

(21) Appl. No.: 10/110,447

(22) PCT Filed: Oct. 13, 2000

(86) PCT No.: PCT/IB00/01463

§ 371 (c)(1),
(2), (4) Date: Jun. 3, 2002

(87) PCT Pub. No.: WO01/26533

PCT Pub. Date: Apr. 19, 2001

(30) Foreign Application Priority Data

Oct. 13, 1999  (IT) .................................. TO990184 U

(51) Int. Cl.⁷ ............................................... G01F 23/00
(52) U.S. Cl. ........................................................ 134/113
(58) Field of Search ........................................... 134/113

(56) References Cited

U.S. PATENT DOCUMENTS 4,141,311 A  *  2/1979  Taylor, Jr. .................... 134/113

* cited by examiner

Primary Examiner—Philippe Derakshani
(74) Attorney, Agent, or Firm—Levine & Mandelbaum

(57) ABSTRACT

A disperser of washing agents is described, for a household washing machine, in particular a dishwasher, said dispenser (10) comprising a tank (12) for containing a liquid washing agent to which a visual control device (17–18) is associated, of the level of said liquid washing agent, said control device comprising a passage (18), placed between said tank (12) and the external part of the body (11) of the dispenser (10), and an element in a substantially transparent material (17) inserted in said passage (18), a first portion (22) of said transparent element (17) being at least partially visible from the outside of said body (11) and a second portion (17B) of said transparent element (17) being inserted in said tank (12), where at the free end of said second portion (17B) a series of projections (20) is defined, being placed at different levels of height.

49 Claims, 6 Drawing Sheets

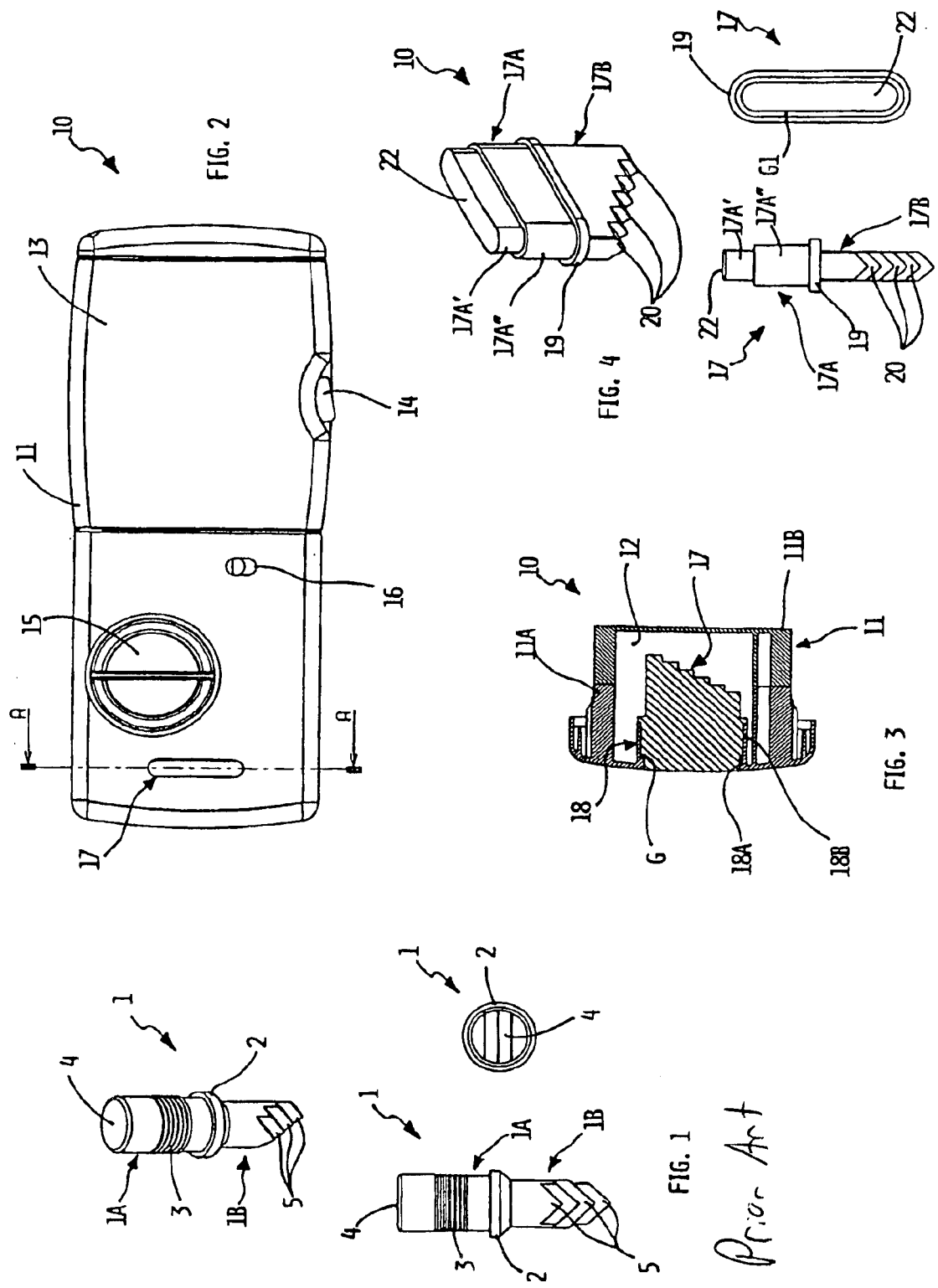

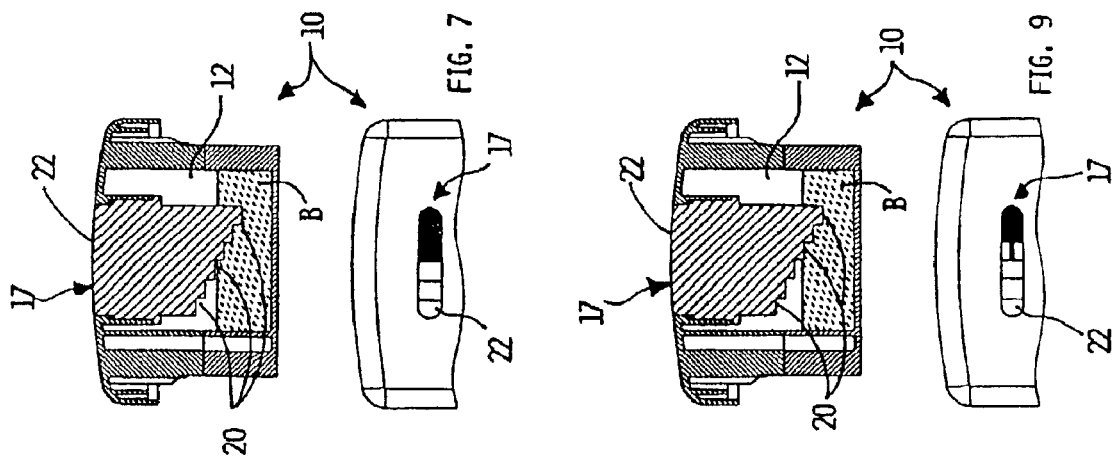
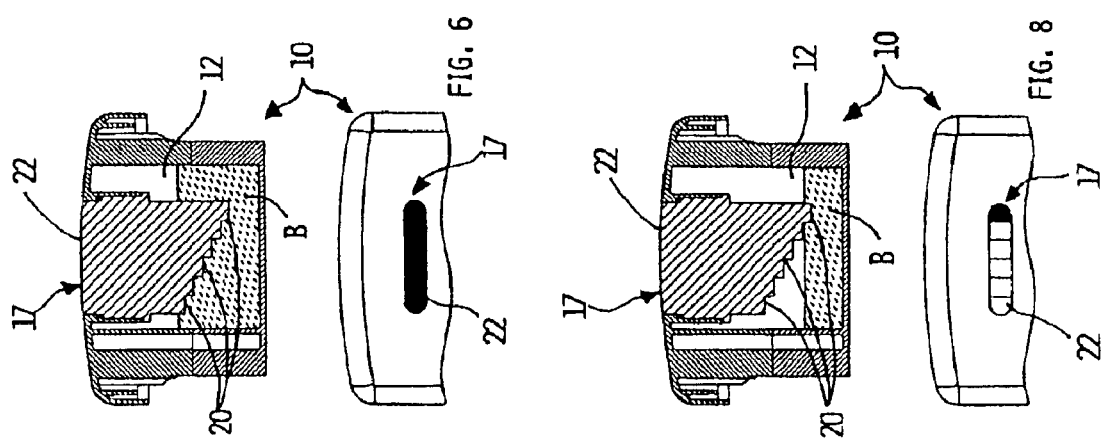
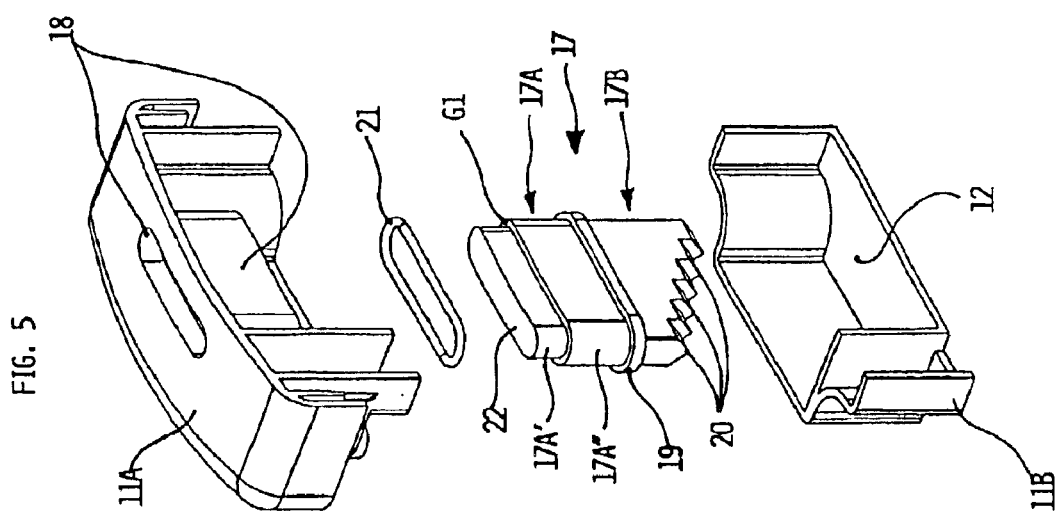

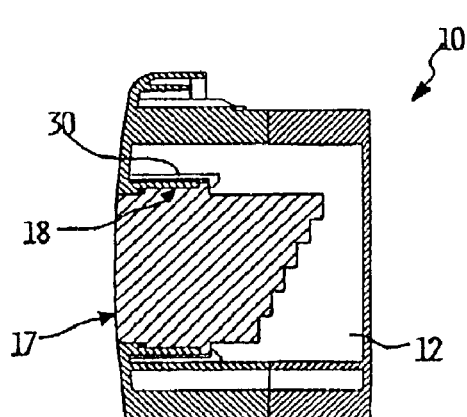
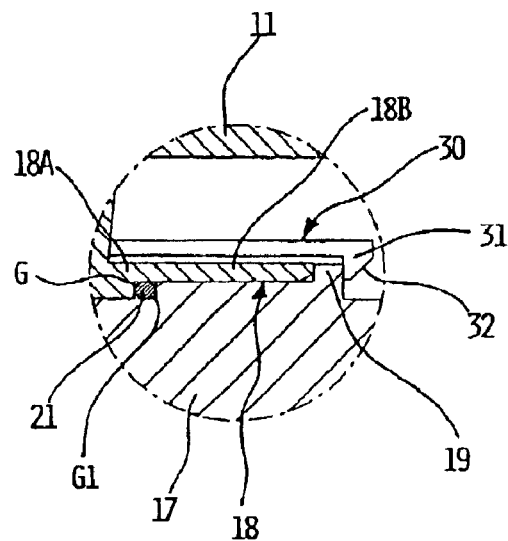
FIG. 10
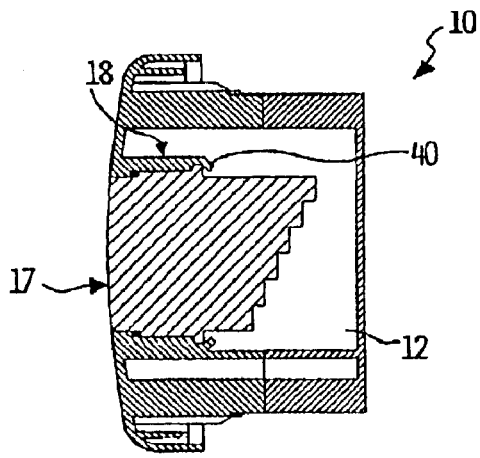
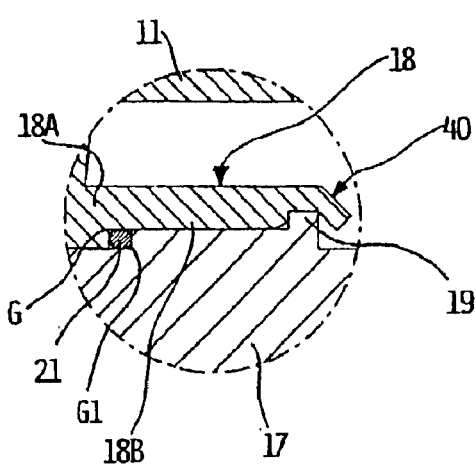
FIG. 11
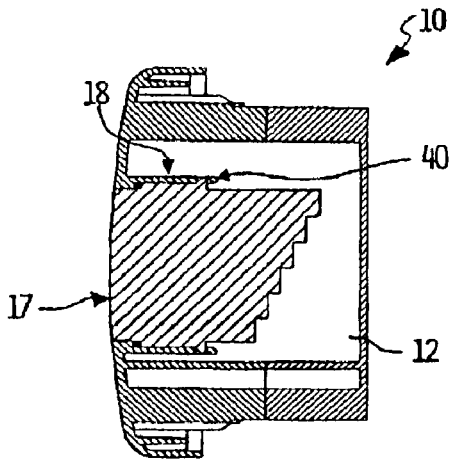
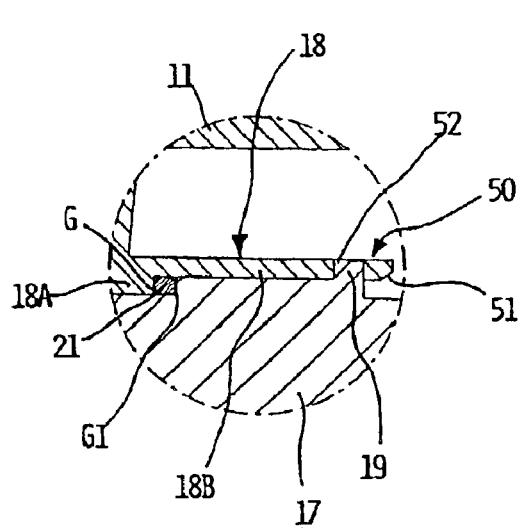
FIG. 12

WASHING AGENTS DISPENSER FOR A DOMESTIC WASHING MACHINE, NAMELY A DISHWASHER

The present invention relates to a dispenser of washing agents for a household washing machine, in particular a dishwasher, of the type indicated in the preamble of annexed claim 1.

It is known that washing machines are equipped with a dispenser of washing agents, intended as washing detergents and additive in powder and/or liquid; the latter consists typically of softeners, in the case of washers, and of rinse aids in the case of dishwashers.

For example, in the case of dishwashers, the dispensers comprise usually a body of plastic material, partially recessed in the counter-door of the machine, i.e. the part of the front loading door of the machine facing the inside of the washing chamber.

The cited body defines, in the front, a space for containing a detergent, usually in powder form, which is provided with a small overturning or sliding closing door; the opening of this small door is suitably controlled by a programmer, or timer, of the machine.

Within the dispenser body is then equipped with a tank, for containing a second washing agent of the liquid type, typically a rinse aid; usually, the quantity of rinse aid that can be loaded in said tank, which is equipped with a special plug, is enough for carrying out several washing cycles.

The inside of the dispenser presents a small cup, associated with the above-mentioned tank, for dosing the quantity of rinse aid to be supplied during a washing cycle; the rinse aid dosing system uses in particular the opening and closing movement of the machine door, horizontal when it is open and vertical when it is closed, to load part of the rinse aid from the tank to the dosing cup; when the machine is operating, the programmer controls an, actuator that frees a discharge opening being present in correspondence of the dosing cup, so that the dose of rinse aid can flow from the latter to the washing tank of the dishwasher.

As said, in general, the capacity of the cited tank is able to contain a quantity of liquid agent which is enough for executing several washing cycles; in this way, the user of the machine has to fill the tank through the relevant plug, only at certain intervals.

The dispensers as those previously mentioned are usually equipped with means for informing the user about the need of filling the cited tank with the liquid washing agent.

In the most sophisticated solutions, for this reason the dispenser is equipped with a suitable electric or electronic sensor, able to detect the presence of the liquid washing agent in the tank; this sensor is properly connected to the machine control system so that the latter, should the lack of liquid washing agent be detected in the tank, enables optical and/or sound signals, like a lamp or a buzzer.

This kind of solution, although being efficient, implies a decisive increase of the total cost of the dispenser, due to the presence of a sensor; also the cost of the machine that uses such a dispenser is higher, considering the need to connect properly the sensor to the control system of the machine and to the relevant signaling means.

In less sophisticated solutions, a simple visual control indicator of the liquid washing agent level is associated to the tank.

This indicator typically comprises a passage of circular section that extends between the tank of the liquid washing agent and the front surface of the dispenser body; an element of transparent plastic material, for example polycarbonate or methacrylate, is inserted at least partially in this passage, having a shape corresponding to that of the passage, and in particular cylindrical; by means of such a transparent element it is possible to have indications concerning the quantity of the liquid washing agent contained in the relevant tank.

A dispenser of the above indicated type is, for example, represented in FIG. 1 of DE-A-195 45 773.

It should however be considered that there are also known solutions in which a same dispenser is equipped with an electric/electronic level sensor as well as with a simple visual control indicator, as those mentioned previously.

The annexed FIG. 1 represents, with different views, the typical known implementation of a transparent element as mentioned above, indicated as a whole with 1.

As it can be noticed, the transparent element 1 presents a mainly cylindrical shape, in which an upper portion 1A and a lower portion 1B can be identified, being delimited from one another by a circular flange 2.

The upper portion 1A is completely cylindrical and is destined to be inserted with interference in the relevant passage defined in the dispenser body; it should be noticed, to this purpose, that the body of a dispenser is usually made of two pieces welded together, and that the portion 1A of the transparent element 1 is inserted in the relevant passage of circular section before this welding operation, from the side being opposite to the surface that will constitute the front of the dispenser.

Portion 1A is inserted in the relevant passage until flange 2 rests on the internal surface of the dispenser body; as said, this insertion occurs with interference, and portion 1A of element 1 is equipped with a series of surface knurls 3, whose function is to avoid possible seeping of the liquid washing agent towards the external part of the tank; following the above-mentioned insertion, the front surface 4 of portion 1A flashes with the front surface of the dispenser body.

The lower portion 1B of the transparent element 1 is destined to be inserted inside the tank containing the liquid washing agent; as it can be noticed, at its lower end a series of projections 5 is defined, each having substantially the shape of a triangular or pentagonal prism, placed side by side and arranged like stairs steps, i.e. lying at different heights.

The operation of such an indicator is very simple.

When the loading door of the dishwasher is open, i.e. in the horizontal position (which is also the typical loading position of the liquid washing agent in the respective tank), the number of projections 5 that are plunged in the liquid washing agent depend on the quantity of the latter; in other words, the higher the level of the washing agent in the tank, the higher the number of projections 5 plunged in it.

In effect, the transparent element 1 is realized in such a way as to transmit visually, from projections 5 to the front surface 4, an indication of the liquid washing agent level, which depends as said on the number of projections 5 that come into contact with the latter; it should be noticed also that, when the liquid washing agent is totally or partially lacking, on the surface 4 will be visible, always due to an optical effect, some horizontal lines, being representative of the longitudinal limits of the projections 5 that are not plunged in the liquid washing agent (see for example the plan view of FIG. 1); in this way, the surface 4 becomes a sort of graduated scale, whose divisions or steps are delimited by the said horizontal lines.

In this way, therefore, when the door of the machine is open (a condition that inevitably precedes the start of the washing cycle), the user has the possibility to make sure about the presence or absence of the liquid washing agent and/or its level.

To this purpose, consider the transparent element 1, equipped with four projections 5 and suppose that the tank of the liquid washing agent is half full.

In this situation, only the two projections being most distant from the surface 4 (i.e. the first two projections 5 starting from the bottom, with reference to FIG. 1) will be plunged in the liquid washing agent. To this, an intermediate level indication corresponds on the front surface 4 of the transparent element 1; in particular, the lower half of the front surface 4 will have a first shade of color, due to the optical effect created by the plunging of the projections 5 in the liquid.

On the contrary, the upper half of surface 4 will appear with a second shade of color, being clearer and substantially corresponding to the normal shade of color of the material forming the transparent element 1; on said second half a horizontal line will also be visible, also due to optical effect, that corresponds to the demarcation line between two projections 5 which are not plunged in the liquid.

Although the solution described above is simple and cheap, it presents some drawbacks.

A first drawback derives from the fact that, according to the known technique, the "reading" of the information deducible from the signaling indicator is not easy but rather difficult, especially when the liquid level in the relevant tank is low. Another drawback connected to the known technique is that, due to the kind of implementation of portion 1B of the transparent element 1, only a limited number of projections 5 can be defined on it; as a result, the user receives just a few indications and/or with a low measurement resolution, concerning the filling of the liquid washing agent tank.

In order to explain the above-mentioned drawbacks, reference can be made to the annexed FIG. 1A, which represents the front surface 4 of the transparent element 1.

As it can be noticed, the divisions of the graduated scale consisting of the front surface 4 of element 1 are visible, being represented by the parallel horizontal lines that, due to optical effect, are visible at the points of demarcation between the different projections 5.

The dimensions in the vertical direction (with reference to the figure) of each division, and of the respective projection 5, which we will call step P, are equal for all projections 5; on the contrary, the dimensions in the horizontal direction of the different divisions and of the respective projections, which we will define as width, are different, since they depend on the circular-shaped section of portion 1B of the element 1; in particular, the two end projections and divisions (i.e. lower and upper) present a smaller width than the maximum possible width, being indicated with L, which concerns the two central divisions and projections.

As seen, therefore, due to the kind of implementation of the prior art, the overall development S of the graduated scale, given by the sum of the single steps P, will never be greater than the dimension of minimum encumbrance or width of the surface 4 (which in this case corresponds to the diameter L of said surface), on which the various steps P have to be represented.

As it can be assumed, in order to allow for a satisfactory reading of the divisions of the graduated scale and an efficient interpretation of the associated level information, the step P, i.e. the relevant dimension of the projections 5, must be big enough; as said, this implies a limited measurement resolution.

Apparently, in order to try to resolve the above-mentioned drawback, it would be possible to reduce the step P, i.e. the relative dimension of the projections 5, by keeping constant the diameter of the portion 1B of element 1; in this way, the graduated scale visible on the front surface 4 of the same element 1 will present a greater number of divisions.

An increase of the measurement resolution obtained in this way would imply however a definite worsening of the comprehensibility of the information deducible from the signaling indicator: it is in fact manifest that the smaller the step P of the scale divisions, the greater the difficulty of interpretation.

On the other hand, the increase in the number of the projections 5, even maintaining an acceptable step P, could be allowed through an increase of the diameter of the transparent element 1.

However, according to the prior art, the diameter of the section of the transparent element 1 must always be quite small; this requirement is determined also by the fact that, during manufacturing, the element 1 is in effect "hammered" in the relevant passage, with a considerable mechanical interference between the parts, in order to obtain a safe positioning and above all, ensure the required sealing.

On the basis of what has been said above, it is clear that the greater the dimensions of the transparent element 1, the greater the required force that shall be, during production, to.

It should also be considered that the greater the dimensions of transparent element 1, and hence the force required to realize its insertion with a considerable interference in the relevant seat, the greater the breaking risks of the components during production.

In other words, since a considerable force must be exercised on the transparent element in order to insert it in a passage having slightly smaller dimensions (in order to ensure a mechanical seal), the probability of breaking the transparent element or the part of the dispenser body in which the passage is defined shall highly increase.

Hence, for the above mentioned reasons, according to the prior art, the transparent element 1 must have a rather small section dimension.

This requirement, as already mentioned previously, makes the "reading" of the information deducible from the signaling indicator difficult; the ensuing limited number of projections 5 determines a lack of indications and/or measure resolution.

Another drawback of the known technique previously described is that the provision of simple knurls 3 on the external surface of the transparent element 1, and the fact that the seal against the seeping of the liquid washing agent is obtained mechanically, result not very efficient and reliable, especially in the long run; consider, for example, that the thermal cycles that occur during the different machine washes can cause tensioning in the structure of the dispenser, giving rise to leaks from the signaling indicator; according to the known technique, such a drawback could get worse in the presence of big-sized indicators and/or having non symmetrical or complex shapes, like a stretched or curved geometry.

The prior art described previously presents also other drawbacks from the production point of view.

During production, in fact, the possible faultiness of the signaling indicator, in terms of lack of sealing, can be detected only during the final testing of the dispenser, i.e. when the latter is completely assembled.

This means that, in case of detected defects, the main part of the dispenser will be lost, without any possibility of reusing it, in particular due to the impossibility of separating the two pieces forming the dispenser body (which are typically welded together). Even in the case of a test before assembling the two pieces of the body, neither the transparent element nor the piece of the body in which the relevant passage is defined, can be reused due to the kind of coupling, which as said assumes a high mechanical interference (in particular, both element 1 and the piece of the body will have undergone a certain deformation during the insertion of the first one in the passage defined in the second one, which makes it impossible to reuse the parts).

SUMMARY OF THE INVENTION

The aim of the present invention is to resolve one or more of the above-mentioned drawbacks, and in particular to indicate a dispenser equipped with an optical control indicator that allows a more precise and reliable visual control in comparison with the known technique, in relation with the presence and/or level of liquid washing agent contained in a tank that is part of the dispenser, and whose realization is more efficient and reliable.

Within this framework, a first aim of the invention is to indicate such a dispenser whose visual control indicator can be read more easily and more precisely than the prior art.

Another aim of the invention is to indicate such a dispenser whose visual control indicator allows to obtain more precise information, i.e. with a higher measurement resolution than the known technique.

Another aim of the invention is to indicate such a dispenser whose visual control indicator is equipped with sealing means that are more reliable than the known technique.

Another aim of the invention is to indicate such a dispenser equipped with means that allow to reduce the force required to realize the coupling of a component of the visual signaling indicator in a relevant seat, in particular in order to avoid faultiness and/or breaking risks during the manufacturing.

One or more of these aims are achieved, according to the present invention, by a dispenser of washing agents for a household washing machine, in particular a dishwasher, having the features of the annexed claims, which form an integral part of the present description.

Further aims, features and advantages of the present invention will become apparent from the following detailed description and the annexed drawings, which are supplied by way of non limiting example, wherein:

DESCRIPTION OF THE DRAWINGS

FIG. 1 represents, with different views, a known transparent element, previously described, being part of a control indicator of the level of the liquid washing agent for a dispenser of washing agents according to the known technique;

FIG. 2 schematically represents, with a front view, a washing agents dispenser according to the present invention;

FIG. 3 schematically represents, with a section view according to the A—A axis of FIG. 2, a washing agents dispenser according to the present invention;

FIG. 4 represents, with different views, a transparent element being part of a control indicator of the level of liquid washing agent of a washing agents dispenser according to the present invention;

FIG. 5 schematically represents in an exploded view a portion of the washing agents dispenser of FIG. 2, inclusive of the transparent element of FIG. 4;

FIGS. 6–9 schematically represents various possible operating conditions of the washing agents dispenser according to the present invention, by means of respective partial front views and sections according to the A—A axis of FIG. 2;

FIGS. 10–12 represent, by means of section views similar to those of FIG. 3, with relevant magnifications, possible alternative embodiments of the washing agents dispenser according to the present invention;

DESCRIPTION OF THE PREFERRED EMBODIMENT

Figure 1A:
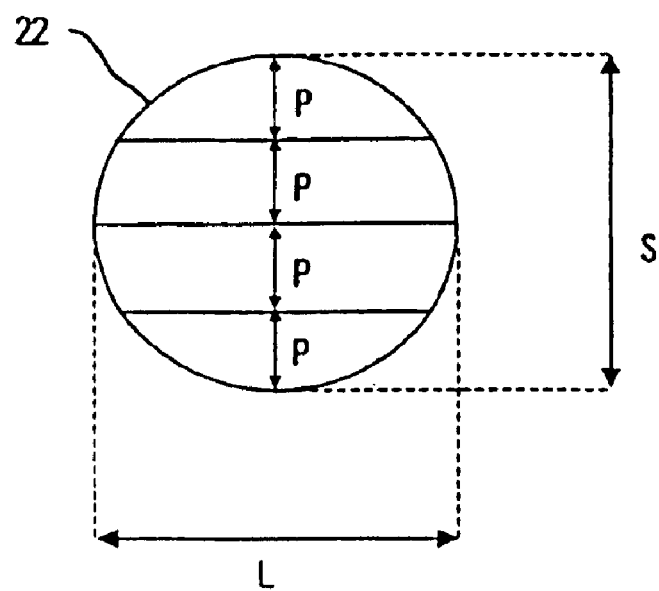
FIG. 1A schematically represents the front surface, visible from the outside of a generic washing agents dispenser, of a transparent element of the type illustrated in FIG. 1.

In FIGS. 2 and 3, 10 indicates as a whole a washing agents dispenser according to the present invention, which presents a box-shaped body 11 that can be housed at least partially in an opening provided in the counter-door of the washing machine door, in particular of a dishwasher; in the case of the mentioned FIGS. 2 and 3, the dispenser 10 is represented in the position that it assumes when the door of the washing machine is closed. As in the prior art, the body 11 is realized by welding a front piece and a back piece, for example made of thermoplastic material, indicated in FIG. 3 with 11A and 11B, respectively.

In the body 11, a space for containing a certain quantity of detergent powder and a tank 12 for containing a liquid washing agent are defined, a dosing cup being associated to the tank 12; the said space and cup, being per se known, are not visible in FIGS. 2 and 3.

13 indicates a small overturning door or flap, for closing the cited space, which is hinged in its upper part and in a known way to part 11A of body 11; 14 indicates an opening/closing device of flap 13, whose type and operation are also known. 15 indicates the plug of an opening communicating with the tank 12, used to load the liquid washing agent in the latter.

16 indicates a discharge opening, through which the liquid washing agent contained in the relevant dosing cup being internal to body 11 can flow towards the washing chamber of the machine; the cited opening 16 is equipped with a special plunger, known per se, controlled by the machine control system, for realizing the supply of the liquid washing agent at the proper moment of a washing cycle.

17 finally indicates as a whole a transparent element, in plastic material, such as polycarbonate or methacrylate, being part of a control indicator of the level of the liquid washing agent, which is at least partially inserted in a passage defined in part 11A of body 11.

As it can be seen in FIG. 3, in correspondence of the cited passage, in part 11A of body 11 an internal seat is defined, indicated with 18, which presents two sections 18A and 18B with different dimensions; in this way, a notch or relief G is defined between the two sections, whose function shall be cleared later.

Transparent element 17 is represented in different views in FIG. 4, by means of views similar to those of FIG. 1.

As it can be noticed, in this case the transparent element 17 presents an oblong-shaped section, i.e. having a greater dimension and a smaller dimension; in particular, in the non limiting example supplied here, the greater dimension of such a section is defined by two parallel straight lengths, which are joint at the two ends by two semicircular lengths, which realize the smaller dimension.

Also in this case, in the body of the transparent element 17 an upper portion 17A and a lower portion 17B can be identified, which are delimited between them by a circular flange 19.

As it can be noticed, the upper portion 17A is formed by two lengths of oblong section, having different dimensions, indicated with 17A' and 17A", between which a notch or relief G1 is defined. The lower portion 17B of the transparent element 17, also having a substantially oblong section, presents at its lower end a series of projections 20, each having substantially the shape of triangular or pentagonal prism, placed side by side and arranged like stairs steps, i.e. lying at different heights.

It can be immediately noticed from FIG. 4 that, thanks to the particular oblong shape of the prevailing section of the transparent element 17, the lower portion 17B of the latter can be equipped with a greater number of projections 20, in particular six, in comparison with the case shown in FIG. 1, even if the dimensions of the plunging section of the projections 20 (i.e. the section being perpendicular to the plunging direction) is at least equal to those of the prior art (the difference between the two cases is the dimension in height of the projections, according to the plunging direction).

FIG. 5 shows, through a partial and exploded view, the assembly system of the transparent element 17 on the body of the dispenser according to the present invention.

The upper portion 17A of the element 17 is intended to be inserted with a light interference, for the reasons explained later, in the relevant seat 18, from the bottom; as said, the body of the dispenser is made of two pieces 11A and 11B welded together, and portion 17A of the transparent element 17 is inserted in the relevant seat 18 before said welding operation, from the opposite side with respect to the surface that will be the front surface of the dispenser.

Before this insertion, on the notch G1 resulting between the two lengths 17A' and 17A" of portion 17A suitable elastic sealing means are mounted, for example an o-ring gasket, indicated in FIG. 5 with 21.

At this point, portion 17A is inserted in the relevant seat, until flange 19 rests on the lower end of the seat 18; following such an insertion, the two sections 17A' and 17A" of portion 17A result in being inserted in the respective portions of the seat 18, with the gasket 21 operating as a seal between the notch G1 defined on the same portion 17A and the notch G defined inside the seat 18 (see FIG. 3); after the above-mentioned insertion, the front surface 22 of the upper portion 17A results substantially flush with the front surface of part 11A of the dispenser body.

At this point, part 11A and part 11B of body 11 are welded together, in such a way as to define inside them the tank 12 for containing the liquid washing agent, where portion 17B of the transparent element 17 is inserted; following such an assembly, the dispenser according to the present invention is as visible in FIG. 3.

The special shape of portion 17B of the transparent element 17, as well as the presence of the sealing means 21 allow to obtain important advantages.

First of all, as said, the dimensions of element 17 can be quite greater that the one provided by the prior art; this is allowed by the fact that, according to the invention, a considerable mechanic interference between the element 17 and the relevant seat 18 is not necessary any more. According to the invention, in fact, the seal on element 17 is further assured by the special elastic means 21.

Consequently, the force required for the insertion of the element 17 in the seat 18 can be moderate and this allows as a result to realize the same element 17 with dimensions being greater than the known technique.

For the same reasons, also the breaking and/or faultiness risks of assembling of the different components, during manufacturing, are extremely reduced; similarly, also in case of defects detected during testing, both element 17 and piece 11A of body 11 shall be easily uncoupled, in order to allow for their possible re-use, if necessary.

It is also clear that, according to the invention, the seal on element 17 is improved through the special elastic sealing means 21, with manifest advantages in terms of efficiency and reliability of the sealing system as to the known technique.

The particular shape of the lower portion 17B of the transparent element 17, as well as its greater dimensions, make the reading of the information deducible from the signaling indicator considerably easier; the fact that in the same element 17 a greater number of projections 20 can be defined with respect to the prior art (even if the step defined by these projections 20 is in the order of that of the known appendages 5) results in the fact that the user can receive more information, with a high measurement resolution, concerning the filling of tank 12 of the liquid washing agent.

For this reason, in FIGS. 6–9 are schematically represented different possible operating conditions of the washing agents dispenser according to the present invention, by means of respective partial front views and sections, according to the A—A axis of FIG. 2; it should be noticed that in the case of the said FIGS. 6 and 9, the dispenser 10 is represented in the position that it assumes when the door of the washing machine is closed.

In the case of FIG. 6, the tank 12 contains the maximum quantity of liquid washing agent possible; as noticed in the upper part of said figure, all projections 20 of the transparent element 17 are therefore plunged in the liquid washing agent, indicated with B.

To this corresponds, as noticed in the lower part of the same figure, a maximum indication of level on a graduated scale of the front surface 22 of the transparent element 17; in particular, this front surface 22 will have completely a first shade of color, due to the optical effect created by the plunging of all projections 20 in the liquid.

In the case of FIG. 7, the tank 12 is half filled; as noticed in the upper part of this figure, only the three projections 20 being most distant from surface 22 (i.e. the first three projections 20 starting from the bottom, with reference to the figure) are plunged in the liquid washing agent B.

To this corresponds, as noticed in the lower part of the same figure, an intermediate indication of level on the front surface 22 of the transparent element 17; in particular, this front surface 22 shall have for approximately half of its development in length the mentioned first shade of color, as determined above, and for approximately half it will appear with a second shade of color, clearer and corresponding to the normal one of the material forming the transparent element 17.

It should be noticed that on this second half of the surface 22 will be visible also, due to the optical effect, the demarcation lines between the projections 20 which are not plunged in the liquid washing agent, i.e. the different divisions of the mentioned graduated scale.

In the case of FIG. 8, the tank 12 is filled very little; as noticed in the upper part of this figure, only the projection 20 being most distant from the surface 22 (i.e. the first projection 20 starting from the bottom, with reference to the figure) is plunged in the liquid washing agent B.

To this corresponds, as noticed in the lower part of the same figure, a minimum indication of level on the front surface 22 of the transparent element 17; this front surface 22 will have, in particular, for approximately one sixth of its development in length the mentioned first shade of color, and for approximately five sixths it will appear with the mentioned second shade of color, and with the relevant lines or divisions of scale.

Finally, in the case of FIG. 9, a little more than one third of tank 12 is filled and in the particular case in which, as noticed in the upper part of the figure, the two projections 20 being most distant from the surface 22 are completely plunged in the liquid washing agent B, while the cusp of the third projection 20 is plunged only partially.

In this case, and as noticed in the lower part of the same figure, a particular indication of level appears on the front surface 22 of the transparent element 17; in fact:
a) two sixths of the development in length of the front surface 22 will have the mentioned first shade of color,
b) a small central portion of one sixth of the development in length of the front surface 22 will appear with the mentioned first shade of color, and the remaining side portions will appear with the mentioned second shade of color (this is due to the fact that, as said, the third projection 20 starting from the right is plunged only partially in the liquid B);
c) the remaining half of the development in length of the front surface 22 will appear completely with the mentioned second shade of color.

Obviously, also in this case the lines or divisions of the graduated scale constituted by the surface 22 will be visible, for all those projections 20 that are not completely plunged in the liquid.

It should be noticed that, in case of transparent elements according to the known technique as the one described in FIG. 1, the situation indicated previously is very frequent, since the number of projections 5 is very limited; this means that, according to the prior art, even when the tank containing the liquid washing agent contains, for example, a bit less than one third, the indication supplied by the transparent element will be similar to that as of previous letter b), but it will not be easily identifiable due to the reduced dimensions.

In other words, according to the prior art, even in the presence of an important quantity of liquid washing agent, the visual indication available is difficult to be read, or the measurement resolution is reduced; vice versa, in the case of the present invention, due to the availability of a greater number of projections (which also have greater dimensions), more easily readable indications are available, with the possibility of detecting easily level fractions that concern the same division of a graduated scale.

FIGS. 10–12 describe some possible variant embodiments of the present invention, whose aims are to further reduce or remove the need of mechanical interference between the element 17 and the relevant seat 18.

In case of FIG. 10, flexible wings 30 are defined inside part 11A of body 11 and sideways with respect to the seat 18; as noticed, these wings 30 present at their free end a hooking tooth 31 whose external surface defines an inclined plane 32.

The assembly of the transparent element 17 is in this case realized by pushing the transparent element 17 towards the inside of the seat 18; at a certain point of this insertion movement, the flange 19 enters into contact with the inclined plane 32 of tooth 31, determining an outward bending of wings 30.

When, proceeding with the insertion movement, the flange 19 surpasses the tooth 31 and a predefined compression is obtained of the sealing element 21 in its working position, the wings 30 return in a flexible way in the initial position; in this way, teeth 31 are seized on the rear surface of the flange 19, as shown in the enlarged part of FIG. 10: in such a situation, the opposing elastic reaction of the sealing element 21 is countered by the locking condition of the flange 19 with respect to teeth 31.

As it can be assumed, with this kind of snap-in coupling, the need of mechanical interference between the element 17 and the internal surfaces of seat 18 can be extremely reduced, or at best eliminated, since the seal is ensured through the element 21.

It should be noticed that, if necessary, the above-mentioned components can be uncoupled by simply determining an outward bending of wings 30.

In the case of FIG. 11, in the free end of portion 18A of the seat 18 an extension is defined, indicated with 40, which forms a sort of a notch with respect to the section of housing 18.

The assembly of the transparent element 17 is realized by pushing the transparent element 17 inside of the seat 18, until the flange 19 reaches the notch defined in correspondence of the extension 40; in this condition, a predefined compression of the sealing element 21 is obtained in the working position. At this point, keeping element 17 in the reached position, the extension 40 is bent, in particular through hot riveting or heading, towards the inside of seat 18 and against flange 19; after ending this operation, the flange 19 is locked between the said notch and the bent part of the extension 40, as shown in the enlarged part of FIG. 11.

As it can be assumed, also in this case the need of mechanical interference between the element 17 and the internal surfaces of the seat 11 can be reduced or at best eliminated, since the seal is ensured through the element 21; if necessary, the above-mentioned components can be uncoupled by reversing the previous operations, or by determining the breaking of the extension 40.

It is clear that, instead of a single extension that surrounds the free internal end of the seat 18, several alternate extensions can be provided.

In the case of FIG. 12, at the free end of portion 18B of the seat 18 an extension 50 is defined, that ends with an inclined plane 51; hooking openings 52 are formed in this extension 50.

In this case, the upper surface of the flange 19 (i.e. the surface intended to face the seat 18) is tilted in the same direction as the plane 51.

The assembly of the transparent element 17 is realized by pushing the same inside the seat 18; at a certain point of this insertion movement, the tilted surface of the flange 19 enters into contact with the inclined plane 51 of the extension 50, determining an outward bending of the latter.

When, proceeding with the insertion movement, the flange 19 reaches the hooking openings 52 and a predefined compression is obtained of the sealing element 21 in its working position, the extension 50 returns in a flexible way to the initial position, in such a way as to lock flange 19 in the same openings 52, as shown in the enlarged part of FIG. 12; in such a situation, the opposing elastic reaction of the sealing element 21 is countered by the locking condition of the flange 19 with respect to the openings 52.

As it can be assumed, also with this kind of snap in coupling, the need of mechanical interference between the element 17 and the internal surfaces of the seat 18 can be reduced or at best eliminated, since the seal is ensured through the element 21. Also in this case, the above-mentioned components can be uncoupled by simply determining an outward bending of the extension(s) 50.

From the description and the attached drawings the advantages of the invention are also clear. In particular, in the described dispenser:

the visual control indicator is easier to read and more precise with respect to the known technique;

the visual control indicator allows to obtain more precise information, i.e. having a higher measurement resolution than the known technique;

the visual control indicator can be equipped with sealing means that are more reliable than the known technique;

the force required to realize the coupling of a component of the visual signaling indicator in the relevant seat can be possibly moderate, in order to avoid faultiness and/or breaking risks during manufacturing.

It is clear that many changes are possible for the man skilled in the art to the washing agents dispenser for a household washing machine, in particular a dishwasher, described as an example, without departing from the novelty spirit of the inventive idea.

For example, in order to increase the sealing characteristics against seepage, the transparent element 17 can be equipped with knurls, in addition to the sealing means 21.

It is also clear that the prevailing section of the transparent element 17, or of its parts, can be different than the one described previously, without changing the greater development of the graduated scale with respect to the known technique, i.e. having a greater dimension (or length) and a smaller dimension (width); for example, the section of the transparent element 17 could be oval shaped in such a way as to fit the relevant positioning points provided by the transparent element and by the relative seat.

Obviously, also the geometry of the projections 20 can be different from the one described previously by way of example, as long as it is proper for the provided objects.

Inter alia, the possibility is pointed out of realizing the coupling between the transparent element and the relevant seat through pasting or welding, for example by ultrasound or other similar known fixing systems.

FIGS. 13-16 represent further possible variant embodiments of a transparent element being part of a control indicator of the level of the liquid washing agent of a washing agents dispenser according to the present invention. Please note that these figures use the same reference numbers of the previous figures, for indicating technically equivalent elements.

Figure 13:
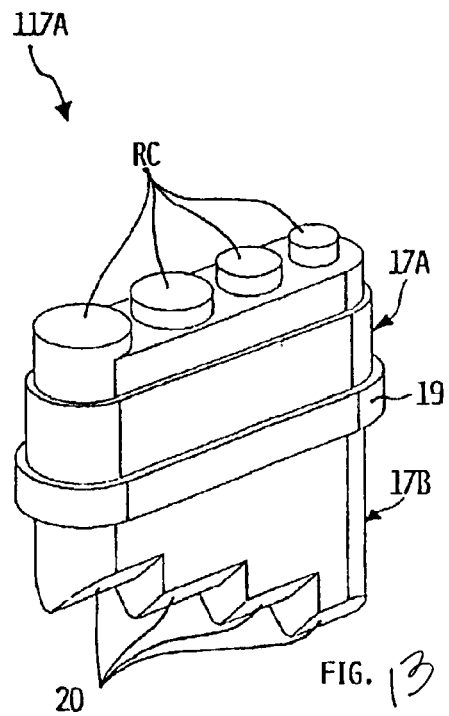
Figure 14:
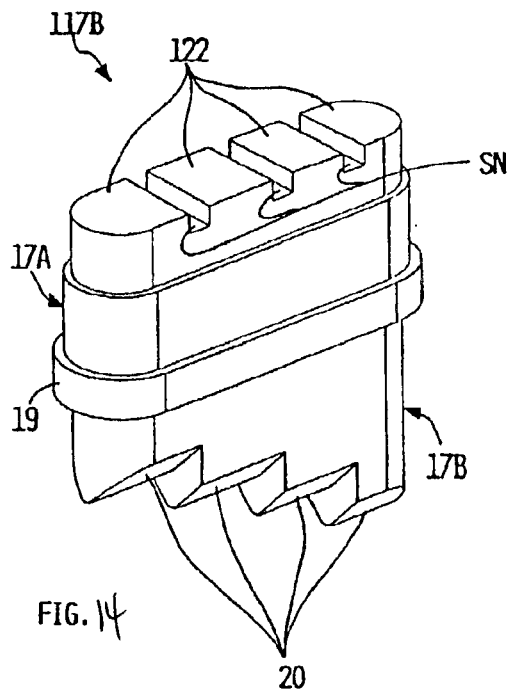

The transparent elements of the variant embodiments of FIGS. 13 and 14, indicated with 117A and 117B respectively, derive substantially from the transparent element 17 of FIGS. 4–5; however, as it can be noticed, in the case of the proposed variants, the front surface of the transparent elements 117A and 117B is not continuous (like surface 22 of element 17 of FIGS. 4 and 5), but appropriately shaped in order to supply more precise level indications.

In particular, in the case of FIG. 13, the upper surface of the transparent element 117A presents reliefs RC having a cylindrical section, while in the case of FIG. 14 on the upper surface of the transparent element 117A grooves SN are defined, that divide the same surface into several zones 122.

As it can be noticed from these figures, the reliefs RC and the zones 122 are aligned with respective projections 20 defined in the lower portion of the transparent elements 117A and 117B; conversely, the free spaces existing between reliefs RC and grooves SN defined between the zones 122 are substantially aligned with the demarcation lines among the said projections 20.

In accordance with the embodiments of FIGS. 13 and 14, the upper end of the seat intended for receiving the transparent element 117A or 117B (i.e. the end being defined in correspondence of the front surface of the dispenser) does not present a single opening, as in the case of the seat 18 of FIG. 5, but a plurality of openings, whose number and shape correspond to the reliefs RC or to the zones 122, and fit for receiving said reliefs or zones.

In this case, therefore, the graduated scale indicating the level of the liquid washing agent will consist of a series of steps, realized by the front surfaces of reliefs RC or areas 122 which are visible outside the dispenser body, which are clearly separated from one another since they are marked off by the same material forming the dispenser body.

In another variant not represented here, reliefs RC or zones 122 could be separated from each other by means of an opaque piece being different from the dispenser body, for example hammered or co-molded; for this case, the upper end of the seat that will receive the transparent element 117A or 117B, presents a single opening, as in the case of seat 18 of FIG. 5.

Figure 15:
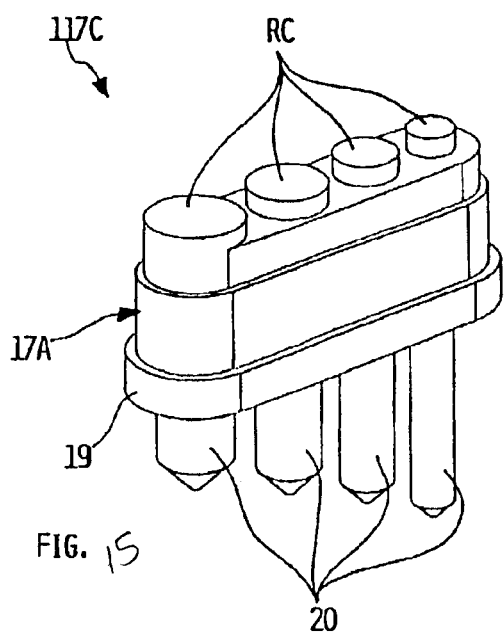
FIGS. 13–16 represent, by means of respective perspective views, further possible variant embodiments of a transparent element being part of a control indicator of the level of liquid washing agent of a washing agents dispenser according to the present invention.
Figure 16:
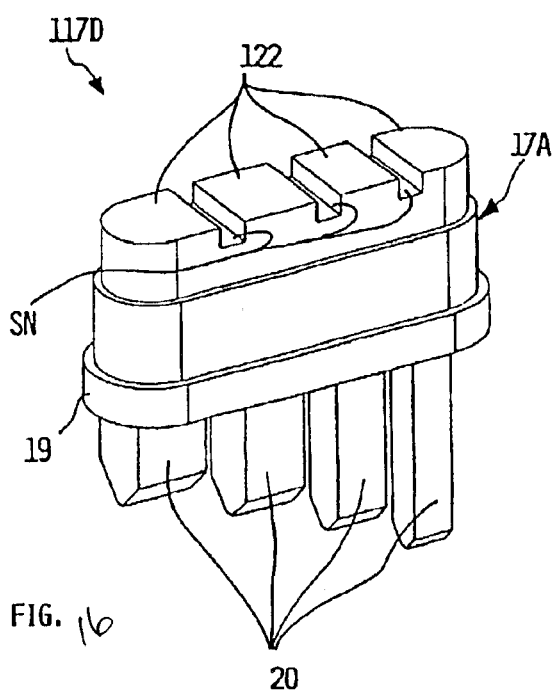

The transparent elements of the variant embodiments of FIGS. 15 and 16, indicated with 117C and 117D respectively, derive substantially from the transparent element 117A of FIG. 13 and from the transparent element 117B of FIG. 14, respectively.

What changes, in this case, is the shape of the projections 20, which are not configured anymore as steps or projections placed side by side and defined along an edge of the lower portion of the transparent element.

In the case of FIG. 15, the projections 20 are distinct and consist of cylindrical parts having a section consonant with that of the reliefs RC, which departs downwards, under the intermediate flange 19 of the transparent element 117C. The same is valid for the case of FIG. 16, where the distinct projections 20 consist of parts having a quadrangular section, whose dimensions are consonant with those of the zones 122, departing downwards, under the intermediate flange 19 of the transparent element 117D.

As it can be noticed, in both cases, the distinct projections 20 present a sharp end, or anyway having a reduced section.

On the other hand, it is manifest how the seat that have to receive the transparent elements 117C and 117D as of FIGS. 14 and 15 is similar to the one previously described for elements 117A and 117B; it is also manifest that the operating principle, for signaling the level of the liquid washing agent, is similar.

It can be deduced from the above how, also in the case of the variants of FIGS. 13–16, the length of the scale indicating the level of the liquid washing agent, meant as the sum of the single steps forming it, is greater in comparison with its width.

Figure 18:
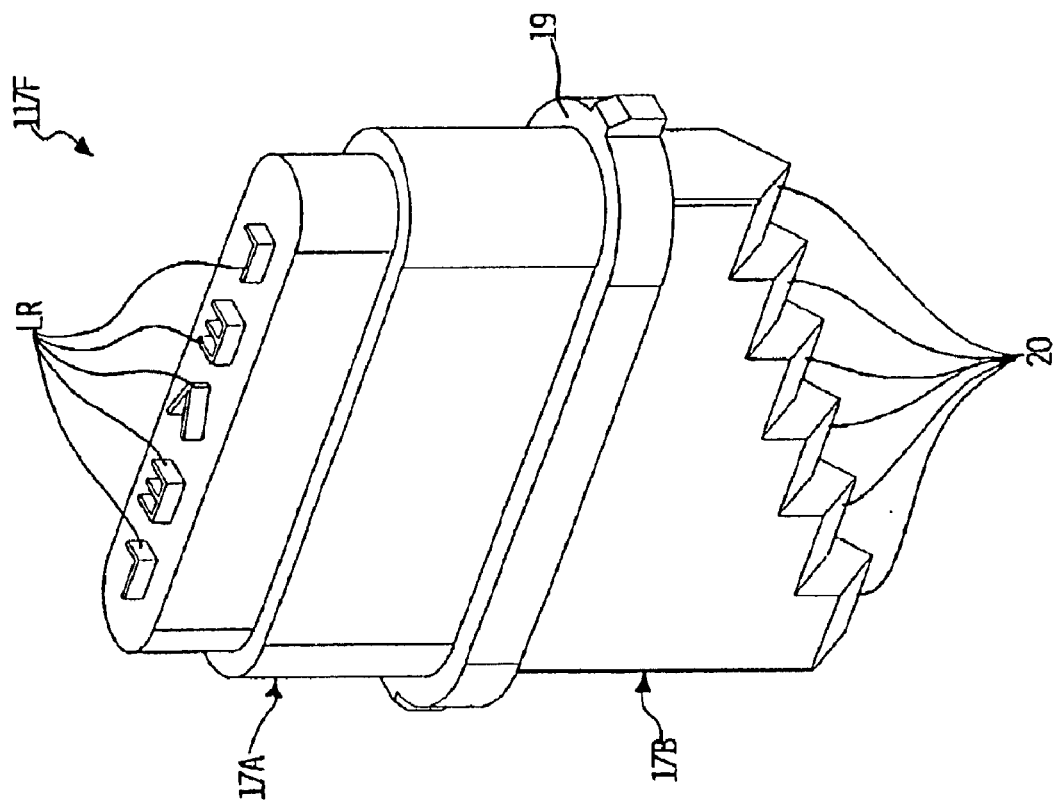
FIGS. 17–18 represent, by means of respective perspective views, further possible variant embodiments of a transparent element being part of a control indicator of the level of liquid washing agent of a washing agents dispenser according to the present invention.
Figure 17:
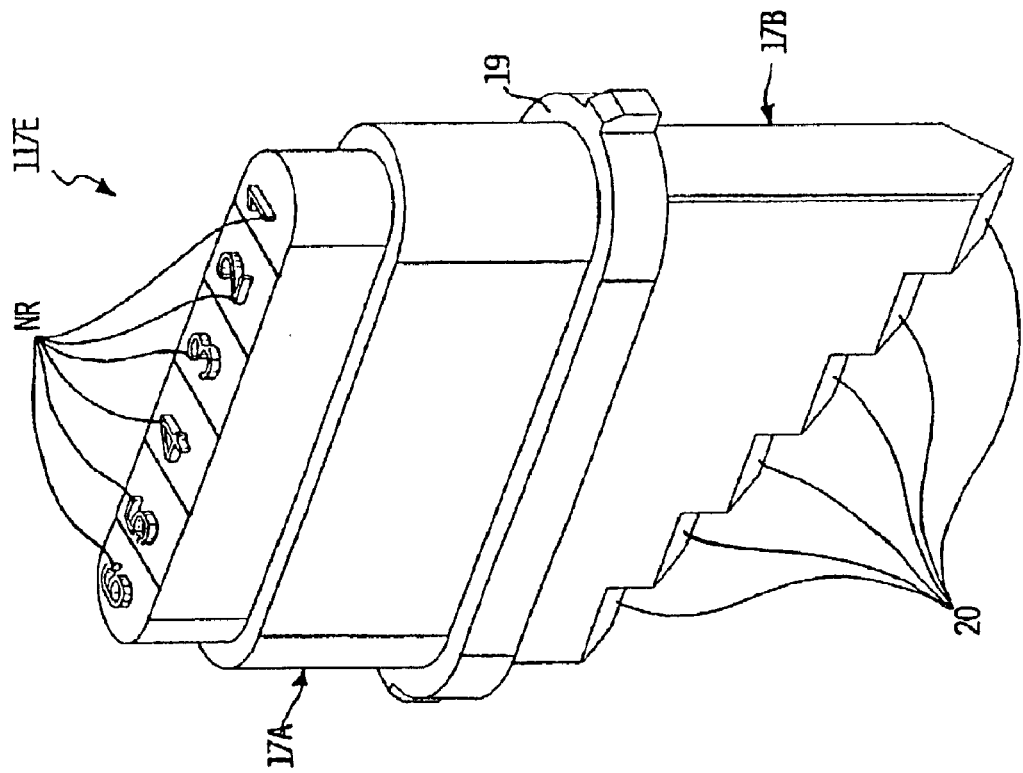

FIGS. 17–18 represent further possible variants of a transparent element being part of a control indicator of the level of liquid washing agent of a washing agents dispenser according to the present invention; also these figures use the same reference numbers of the previous figures to indicate technically equivalent elements.

The transparent elements as of the variants of FIGS. 17 and 18, indicated with 117E and 117F respectively, derive substantially from the transparent element 17A of FIGS. 4–5; however, as it can be noticed, in the case of the proposed variants, on the front surface 22 of the transparent element 117E raised numbers NR are defined, while on the front surface 22 of the transparent element 117D raised letters LR are defined. As it can be noticed from these figures, the numbers RN or the letters LR are aligned with respective projections 20 defined in the lower portion 17B of the transparent elements 117E and 117F; conversely, the free spaces existing between these numbers or letters are substantially aligned with the demarcation lines among the said projections 20.

Also in this case, the upper end of the seat that will receive the transparent element 117E or 117F (i.e. the end present in correspondence with the front surface of the dispenser) does not present a single opening, as in the case of housing 18 of FIG. 5, but a plurality of openings whose number and shapes correspond to the numbers NR or letters LR, and fit for receiving the latter ones.

In this case, therefore, the graduated scale indicating the level of the liquid washing agent will consist of a series of steps, realized by the front surfaces of the number RC or the letters LR being visible outside the dispenser body, which are clearly separated from one another since they are marked off by the same material forming the dispenser body.

In the example of FIG. 17, the cited graduated scale consists of the series of numbers "6", "5", "4", "3", "2" and "1", where in particular the number indicates the level of the liquid washing agent (in the example, "6" corresponds to a full tank, and "1" corresponds to the minimum level); in the case of FIG. 18, the said graduated scale consists of a series of characters, for example forming a word (in the example, the word is "LEVEL").

Obviously, the assembly process of the transparent elements 117E and 117F according to the offered variant embodiments is substantially the one already described before; similarly, the operation of the dispenser, for signaling the level of the liquid washing agent, is exactly the same as described previously.

Obviously, in alternative embodiments, on the front surface 22 of the transparent element can be define, instead of numbers or letters, symbols or different kind of figures, or a combination of alphanumeric characters.

As it can be assumed, also the variant of FIGS. 17–18 is particularly advantageous, both for what concerns the possibility of managing several aesthetic variants of the dispenser and for what concerns the quality of the level signaling; in this case, in fact, besides the signaling which consists of the different shades of color that the different letters or numbers or symbols have according to the quantity of washing agent being available, the user also receives a more direct information.

Finally, it must be pointed out that, regardless of the shape of the reliefs RC, zones 122, letters or numbers or symbols NR–LR, the required sealing is always ensured by means of at least one part of the upper portion of the transparent elements, for example having an oval section and fit to be inserted in the respective seat, operating in sealing by means of a gasket and/or through a mechanical interference, as already previously mentioned.

If the ends of the projections destined to be plunged in the liquid washing agent are conical or truncate cone shaped, their taper will be preferably of 90° (i.e., for example, in case of conical shape, this will derive from the revolution of a right-angled triangle whose angle related to the cone vertex is 45°); in case of prismatic ends, or similar, two opposing end faces will be inclined at 90° from one another.

What is claimed is:

1. Dispenser of washing agents for a household washing machine, in particular a dishwasher; said dispenser comprising a tank for containing a liquid washing agent whereto a visual control device is associated, of the level of said liquid washing agent, said control device comprising a passage, extending between said tank and an external part of the body of the dispenser, and an element in a substantially transparent material being inserted in said passage, wherein:
   a first portion of said transparent element is at least partially visible from the outside of said body and a second portion of said transparent element results in being inserted in said tank,
   at the free end of said second portion a plurality of projections is defined, being arranged at different levels of height, and on at least a zone of the visible surface of said first portion some steps can be recognized, of a scale indicating the level of said liquid washing agent in said tank,
   each of said steps corresponds to one of said projections and can assume at least two different shades of color, depending on the fact that the respective projection is dipped or not in said liquid washing agent, in order to provide a relevant visual indication of level on said scale,
wherein at least said first portion of said transparent element has a longitudinal section having one dimension much longer than the other one in order to allow for an easier and more precise comprehensibility of the information supplied by said device for the visual control of the level of said liquid; said longitudinal section of said first portion having a perimeter of a regular development, in order to allow a good coupling with sealing means between said transparent element and said passage of said dispenser.

2. Dispenser, according to claim 1, wherein the perimeter of said longitudinal section of said first portion and/or said longitudinal section of said second portion of said transparent element presents two parallel straight length segments, being joined at the two ends by two semicircular segments.

3. Dispenser, according to claim 1, wherein sealing means of the elastic type are provided, operating between said passage and said transparent element, where said passage (18) and said transparent element are equipped with respective positioning means of said sealing means in the working position.

4. Dispenser, according to claim 3, wherein said sealing means are designed for adapting to the shape of said positioning means, and comprise a ring gasket.

5. Dispenser, according to claim 1, wherein said passage presents at least two sections having different dimensions.

6. Dispenser, according to claim 3, wherein said positioning means of said passage comprise a notch or relief defined between said two sections.

7. Dispenser, according to claim 1, wherein a flange is defined between said first portion and said second portion of said transparent element.

8. Dispenser, according to claim 1, wherein said first portion is formed by at least of two lengths having different sections.

9. Dispenser, according to claim 5 and wherein said positioning means of said transparent element comprise a notch or relief defined between said two lengths.

10. Dispenser, according to claim 1, wherein said projections have substantially a triangular or pentagonal prism shape.

11. Dispenser, according to claim 1, wherein said transparent element is coupled to the said passage through a coupling having a moderate mechanical interference between the parts.

12. Dispenser, according to claim 1, wherein coupling means are provided for said transparent element and said passage, in order to maintaining the correct working position of said transparent element within said passage when assembled together for granting the sealing of said tank.

13. Dispenser, according to claim 12, wherein said coupling means comprise first means stiffly connected to said passage of said dispenser and second means stiffly connected to said transparent element, adapted to realize a snapping or flexible sort of coupling.

14. Dispenser, according to claim 13, wherein said means comprise at least one flexible wing, being equipped with at least one hooking tooth.

15. Dispenser, according to claim 14, wherein said hooking tooth presents at least an inclined plane, operable for being brought into contact with one part of said transparent element, during the assembly of the latter in said passage, in order to produce a bending of said wing.

16. Dispenser, according to claim 15, wherein said tooth is capable of hooking on said part of said transparent element, in a condition of compression of said sealing means.

17. Dispenser, according to claim 13, wherein said first means comprise at least a flexible portion wherein at least one hooking opening is defined, said flexible portion presenting an inclined plane at the free end.

18. Dispenser, according to claim 17, wherein said part of said transparent element is in relief and comprises at least one inclined surface, adapted to be brought into contact with said inclined plane of said flexible portion, during the assembly of said transparent element within said passage, for producing a bending of said flexible portion.

19. Dispenser, according to claim 17, wherein said hooking openings are capable of retaining said raised part of said transparent element, in a condition of compression of said sealing means.

20. Dispenser, according to claim 12, wherein said passage of said dispenser comprises an end area adapted to be deformed during the introduction of said transparent element within said passage and to assure, when assembled together, the maintaining of a correct working position of said transparent element within said passage.

21. Dispenser, according to claim 20, wherein said end area is shaped convergent towards the axis of said passage, in order to lock mechanically said part of said transparent element, in a condition of compression of said sealing means.

22. Dispenser, according to claim 21, wherein said convergent shaping of said end area is executed through hot-riveting or hot-heading of said end area.

23. Dispenser, according to claim 1, wherein said transparent element is realized with a plastic material, like polycarbonate or methacrylate.

24. Dispenser, according to claim 1, wherein said sealing means comprise an o-ring or a square-ring.

25. Dispenser, according to claim 1, wherein the coupling between said passage and said transparent element is realized through pasting or welding, through ultrasound or similar fixing technique.

26. Dispenser, according to claim 1, wherein said body is realized by welding a front piece and a rear piece.

27. Dispenser, according to claim 1, wherein al least some of said steps of a scale indicating the level of said washing liquid agent in said tank are delimited by lines being substantially horizontal and parallel, highlighted due to optical effect on said visible surface of said transparent element.

28. Dispenser, according to claim 1, wherein said visible surface of said first portion presents relieves.

29. Dispenser, according to claim 1, wherein said visible surface of said first portion presents interruptions, which divide said visible surface into several separate areas.

30. Dispenser, according to claim 28 wherein said relieves or said separate areas are substantially aligned with respective projections.

31. Dispenser, according to claim 25 wherein the upper end of said passage presents a plurality of openings, whose number and shape correspond to said relieves or to said separate area, said scale being realized by the surfaces of said relieves or said separate areas being visible outside said body, the steps of said scale being clearly separated from each other by opaque material and/or forming said body.

32. Dispenser, according to claim 1, wherein said projections are formed by distinct parts of said second portion, said parts having a circular or polygonal section.

33. Dispenser, according to claim 1, wherein said at least one zone of the visible surface of said first portion is shaped to define numbers and/or symbols and/or figures and/or alphabetic or alphanumeric characters.

34. Dispenser, according to claim 33, wherein said numbers and/or symbols and/or figures and/or alphabetic or alphanumeric characters are substantially aligned with respective projections.

35. Dispenser, according to claim 33 wherein said passage presents an outer surface, visible from the outside of said body of said dispenser, is shaped to be complementary to said numbers and/or symbols and/or figures and/or alphabetic or alphanumeric characters.

36. Dispenser, according to claim 32 wherein said scale indicating the level of said washing liquid agent in said tank, is realized by the surfaces of said numbers and/or symbols and/or figures and/or alphabetic or alphanumeric characters being visible on the outside of said body, the steps of said scale being clearly separated from one another by opaque material and/or forming said body.

37. Dispenser, according to claim 1, wherein at least some of said projections are arranged in pairs, the two projections of each pair laying at the same height, the various pairs laying at different heights.

38. Process for assembling a transparent element belonging to a device for a visual control of the level of a washing liquid agent contained in a tank of a washing agents dispenser for a domestic dishwasher, inside said tank of said dispenser, comprising the steps of:

defining in said transparent element a first portion capable to be inserted in a passage shaped in a front piece of a body of;

said dispenser, said front piece having an outer surface and an inner surface;

defining in said transparent element a second portion adapted to be substantially dipped into said washing liquid agent;

applying sealing means on said first portion of said transparent element;

addressing said first portion, arranged with said sealing means, toward the entry of said passage of said front piece from said inner surface;

inserting said transparent element, arranged with said sealing means, into said passage until said transparent element and said passage are mutually coupled, said transparent element being consequently blocked inside said passage;

fixing a respective inner surface of a rear piece to said inner surface of said front piece of said body, in order to form said tank of said dispenser, said tank therefore being pre-formed in two parts;

whereby an outwardly visible surface of said transparent element is substantially lined up with said outer surface of said front piece for allowing a better visualization of said level of the washing liquid agent to be contained in said tank.

39. Process, according to claim 38, wherein said device for a visual control of the level of a washing liquid agent, tank, transparent element, passage, body scaling means, are comprised in a dispenser having a tank for containing a liquid washing agent whereto a visual control device is associated, of the level of said liquid washing agent, said control device comprising a passage, extending between said tank and an external part of the body of the dispenser, and an element in a substantially transparent material being inserted in said passage, wherein:

a first portion of said transparent element is at least partially visible from the outside of said body and a second portion of said transparent element results in being inserted in said tank, at the free end of said second portion a plurality of projections is defined, being arranged at different levels of height, and on at least a zone of the visible surface of said first portion some steps can be recognized, of a scale indicating the level of said liquid washing agent in said tank, each of said steps corresponds to one of said projections and can assume at least two different shades of color, depending on the fact that the respective projection is dipped or not in said liquid washing agent, in order to provide a relevant visual indication of level on said scale, wherein at least said first portion of said transparent element has a longitudinal section having one dimension much longer than the other one in order to allow for an easier and more precise comprehensibility of the information supplied by said device for the visual control of the level of said liquid; said longitudinal section of said first portion having a perimeter of a regular development, in order to allow a good coupling with sealing means between said transparent element and said passage of said dispenser.

40. Process, according to the claim 38 wherein, in order to carry out the step e), said first portion is to be worked or machined for realizing a slight interference with said passage during the insertion of said transparent element into said passage.

41. Process, according to claim 38 wherein the fixing of the step i) is actuated by welding.

42. Dispenser, according to claim 1, wherein said perimeter of said longitudinal section of said first portion is constituted without sharp edges, in order to allow a good coupling with sealing means without mechanical stress concentration.

43. Dispenser, according to claim 42, wherein a longitudinal section of said second portion of said transparent element, chosen substantially parallel to the outer surface of said body of said dispenser, has one dimension much longer than the other one.

44. Dispenser, according to claim 1 wherein a general section of said transparent element, chosen substantially parallel to the outer surface of said body of said dispenser, has one dimension much longer than the other one.

45. Dispenser, according to claim 1 wherein the perimeter of said longitudinal section of said first portion and/or said longitudinal section of said second portion of said transparent element has at least some of its profile constituted by a curve.

46. Dispenser, according to claim 5, wherein said passage has a longitudinal section having one dimension much longer than the other one, in order to allow for an easier and more precise comprehensibility of the information supplied by said device for the visual control of the level of said liquid; said longitudinal section of said passage having a perimeter of a regular development, in order to allow a good coupling with sealing means between said transparent element and said passage of said dispenser.

47. Dispenser, according to claim 46, wherein said perimeter of said longitudinal section of said passage is constituted without sharp edges, in order to allow a good coupling with sealing means without mechanical stress concentration.

48. Dispenser, according to claim 47, wherein said perimeter of said longitudinal section of said passage has at least some of its profile constituted by a curve.

49. Dispenser, according to claim 48, wherein said perimeter of said longitudinal section of said passage presents two parallel straight length segments, being joined at the two ends by two semicircular segments.

* * * * *